US012638705B2

(12) United States Patent
  Chung

(10) Patent No.: US 12,638,705 B2
(45) Date of Patent: May 26, 2026

(54) DISPLAY PANEL AND MANUFACTURING METHOD THEREOF

(71) Applicant: HannStar Display Corporation, Taipei City (TW)

(72) Inventor: Chia-Lin Chung, Kaohsiung City (TW)

(73) Assignee: HannStar Display Corporation, Taipei City (TW)

( * ) Notice: Subject to any disclaimer, the term of this patent is extended or adjusted under 35 U.S.C. 154(b) by 309 days.

(21) Appl. No.: 18/362,980

(22) Filed: Aug. 1, 2023

(65) Prior Publication Data

US 2024/0411166 A1 Dec. 12, 2024

(30) Foreign Application Priority Data

Jun. 7, 2023 (CN) .......................... 202310669176.5

(51) Int. Cl.
  *G02F 1/1333* (2006.01)
  *G02F 1/133* (2006.01)
  *G02F 1/1335* (2006.01)
(52) U.S. Cl.
  CPC .... *G02F 1/133305* (2013.01); *G02F 1/13306* (2013.01); *G02F 1/133528* (2013.01)

(58) Field of Classification Search
  CPC .................................................. G02F 1/133305
  See application file for complete search history.

(56) References Cited

U.S. PATENT DOCUMENTS

2021/0223622 A1* 7/2021 Kamijo ............. G02F 1/133615

* cited by examiner

*Primary Examiner* — Edmond C Lau
(74) *Attorney, Agent, or Firm* — JCIPRNET

(57) ABSTRACT

A display panel, including a first substrate, a second substrate, a liquid crystal layer, a first polarizer, a second polarizer, and a circuit board, is provided. The first substrate has a display area and a bonding area outside the display area. The second substrate overlaps with the first substrate and exposes the bonding area. The liquid crystal layer is disposed between the first substrate and the second substrate, and overlaps with the display area. The first polarizer is disposed on a surface of the first substrate facing away from the second substrate. The second polarizer is disposed on a surface of the second substrate facing away from the first substrate. The circuit board is bonded to the bonding area. A first side wall of the second substrate facing the bonding area is flush with a second side wall of the second polarizer facing the bonding area.

4 Claims, 15 Drawing Sheets

DISPLAY PANEL AND MANUFACTURING METHOD THEREOF

CROSS-REFERENCE TO RELATED APPLICATION

This application claims the priority benefit of China application serial no. 202310669176.5, filed on Jun. 7, 2023. The entirety of the above-mentioned patent application is hereby incorporated by reference herein and made a part of this specification.

BACKGROUND

Technical Field

The disclosure relates to a display panel and a manufacturing method thereof, and in particular to a display panel with a flexible substrate and a manufacturing method thereof.

Description of Related Art

Generally speaking, during the assembly process of a display panel, a liquid crystal layer is sandwiched between two substrates and sealed with a sealant, and a bonding pad disposed in a peripheral area of one substrate is covered by the other substrate. Therefore, the other substrate must be cut after assembly to expose the bonding pad for bonding a circuit board. However, when the substrate is flexible and not stiff enough, film shrinkage or film warping may easily occur during the cutting process of the substrate, which causes difficult separation or poor operation.

SUMMARY

The disclosure provides a display panel, which has a circuit board with a relatively high bonding yield.

The disclosure provides a manufacturing method of a display panel, which has an improved cutting process yield of a substrate for exposing a bonding pad.

According to an embodiment of the disclosure, a display panel includes a first substrate, a second substrate, a liquid crystal layer, a first polarizer, a second polarizer, and a circuit board. The first substrate has a display area and a bonding area outside the display area. The second substrate overlaps with the first substrate and exposes the bonding area of the first substrate. The liquid crystal layer is disposed between the first substrate and the second substrate, and overlaps with the display area. The first polarizer is disposed on a surface of the first substrate facing away from the second substrate. The second polarizer is disposed on a surface of the second substrate facing away from the first substrate. The circuit board is bonded to the bonding area of the first substrate. A first side wall of the second substrate facing the bonding area is flush with a second side wall of the second polarizer facing the bonding area.

In the display panel according to an embodiment of the disclosure, the second substrate further has a third side wall facing the bonding area. The third side wall is perpendicular to the first side wall. The second polarizer further has a fourth side wall facing the bonding area, and the third side wall of the second substrate is flush with the fourth side wall of the second polarizer.

In the display panel according to an embodiment of the disclosure, the second substrate further has a fifth side wall facing the bonding area and opposite to the third side wall.

The fifth side wall is perpendicular to the first side wall. The second polarizer further has a sixth side wall facing the bonding area and opposite to the fourth side wall, and the fifth side wall of the second substrate is flush with the sixth side wall of the second polarizer.

In the display panel according to an embodiment of the disclosure, the first side wall, the third side wall, and the fifth side wall define a notch of the second substrate, and the circuit board is bonded to the bonding area of the first substrate via the notch of the second substrate.

In the display panel according to an embodiment of the disclosure, the first substrate is further provided with a peripheral area outside the display area and the bonding area. The second substrate does not overlap with the peripheral area. The bonding area and the peripheral area are arranged along a first direction. The second substrate has a first side edge and a second side edge facing away from each other along the first direction. The first side wall extends from the first side edge to the second side edge and faces the peripheral area.

In the display panel according to an embodiment of the disclosure, the display panel further includes a first notch and a second notch. The first notch is disposed on a side of the bonding area. The first substrate, the second substrate, the first polarizer, and the second polarizer are respectively flush with a side wall of the first notch defining the first notch. The second notch is disposed on other side of the bonding area. The first substrate, the second substrate, the first polarizer, and the second polarizer are respectively flush with a side wall of the second notch defining the second notch.

In the display panel according to an embodiment of the disclosure, the side wall of the first notch and the side wall of the second notch of the first substrate define a protruding portion of the first substrate, and the protruding portion is provided with the bonding area.

In the display panel according to an embodiment of the disclosure, the first notch, the bonding area, and the second notch are arranged along a first direction. The first substrate has a first side edge and a second side edge facing away from each other along the first direction. The side wall of the first notch of the first substrate extends from the first side edge, and the side wall of the second notch of the first substrate extends from the second side edge.

According to an embodiment of the disclosure, a manufacturing method of a display panel includes assembling a first substrate and a second substrate, so that a liquid crystal layer is sandwiched between the first substrate and the second substrate, attaching a first polarizer to a surface of the first substrate facing away from the second substrate, attaching a second polarizer to a surface of the second substrate facing away from the first substrate, cutting the second substrate and the second polarizer according to a first cutting line to remove a part of the second substrate and the second polarizer overlapping with a bonding area and expose the bonding area, and bonding a circuit board to the bonding area of the first substrate. The first substrate is provided with a display area and the bonding area outside the display area. The liquid crystal layer overlaps with the display area.

In the manufacturing method of the display panel according to an embodiment of the disclosure, the step of cutting the second substrate and the second polarizer according to the first cutting line includes cutting the second substrate and the second polarizer according to a first line segment of the first cutting line and cutting the second substrate and the second polarizer according to a second line segment and a third line segment of the first cutting line. The second line segment and the third line segment are located on two opposite sides of the bonding area and are respectively perpendicular to the first line segment. A notch corresponding to the first cutting line is formed after removing the part of the second substrate and the second polarizer overlapping with the bonding area, and the circuit board is bonded to the bonding area of the first substrate via the notch of the second substrate and the second polarizer.

In the manufacturing method of the display panel according to an embodiment of the disclosure, the second substrate has a first side edge and a second side edge located on two opposite sides of the display area and the bonding area, and the first cutting line extends from the first side edge to the second side edge.

The manufacturing method of the display panel according to an embodiment of the disclosure further includes the following steps. The first substrate, the second substrate, the first polarizer, and the second polarizer are cut according to a second cutting line to remove a part of the first substrate, the second substrate, the first polarizer, and the second polarizer located on a side of the bonding area and form a first notch. The first substrate, the second substrate, the first polarizer, and the second polarizer are cut according to a third cutting line to remove a part of the first substrate, the second substrate, the first polarizer, and the second polarizer located on other side of the bonding area and form a second notch.

In the manufacturing method of the display panel according to an embodiment of the disclosure, the first notch and the second notch are formed before removing the part of the second substrate and the second polarizer overlapping with the bonding area.

In the manufacturing method of the display panel according to an embodiment of the disclosure, the first substrate has a first side edge and a second side edge facing away from each other and a third side edge connecting the first side edge and the second side edge. The first cutting line is parallel to the third side edge of the first substrate. The second cutting line bendingly extends from the first side edge to the third side edge, and the third cutting line bendingly extends from the second side edge to the third side edge.

In the manufacturing method of the display panel according to an embodiment of the disclosure, after forming the first notch and the second notch, the first substrate is formed with a protruding portion, and the circuit board is bonded to the bonding area on the protruding portion.

Based on the above, in the manufacturing method of the display panel according to an embodiment of the disclosure, the polarizer is first entirely attached to the substrate before removing the part of the substrate overlapping with the bonding area. In this way, film shrinkage or film warpage during the cutting process due to insufficient stiffness of the substrate can be prevented, thereby improving the bonding yield of the circuit board during the subsequent manufacturing process.

DESCRIPTION OF THE EMBODIMENTS

Figure 1:
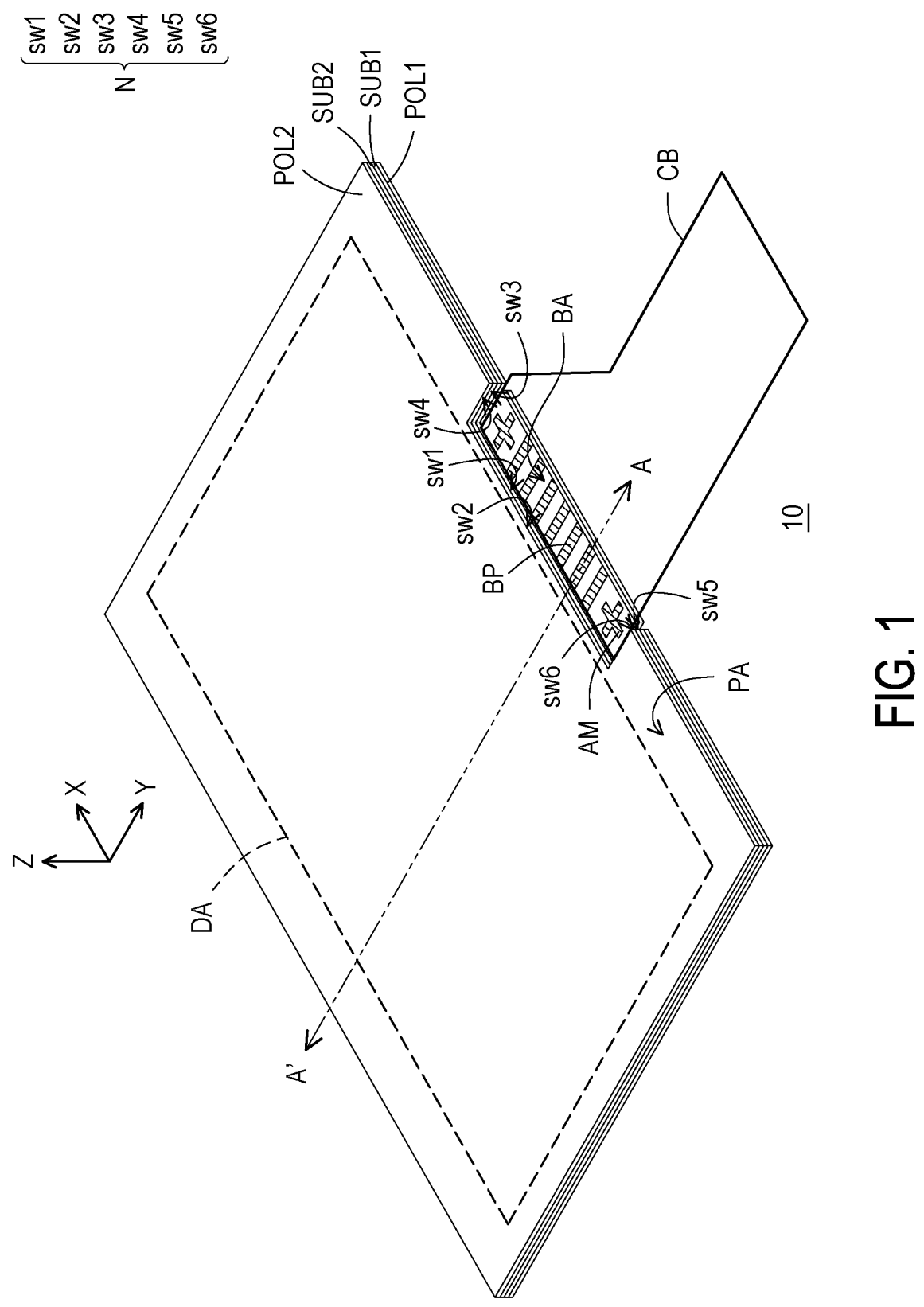
FIG. 1 is a schematic view of a display panel according to a first embodiment of the disclosure.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Figure 2:
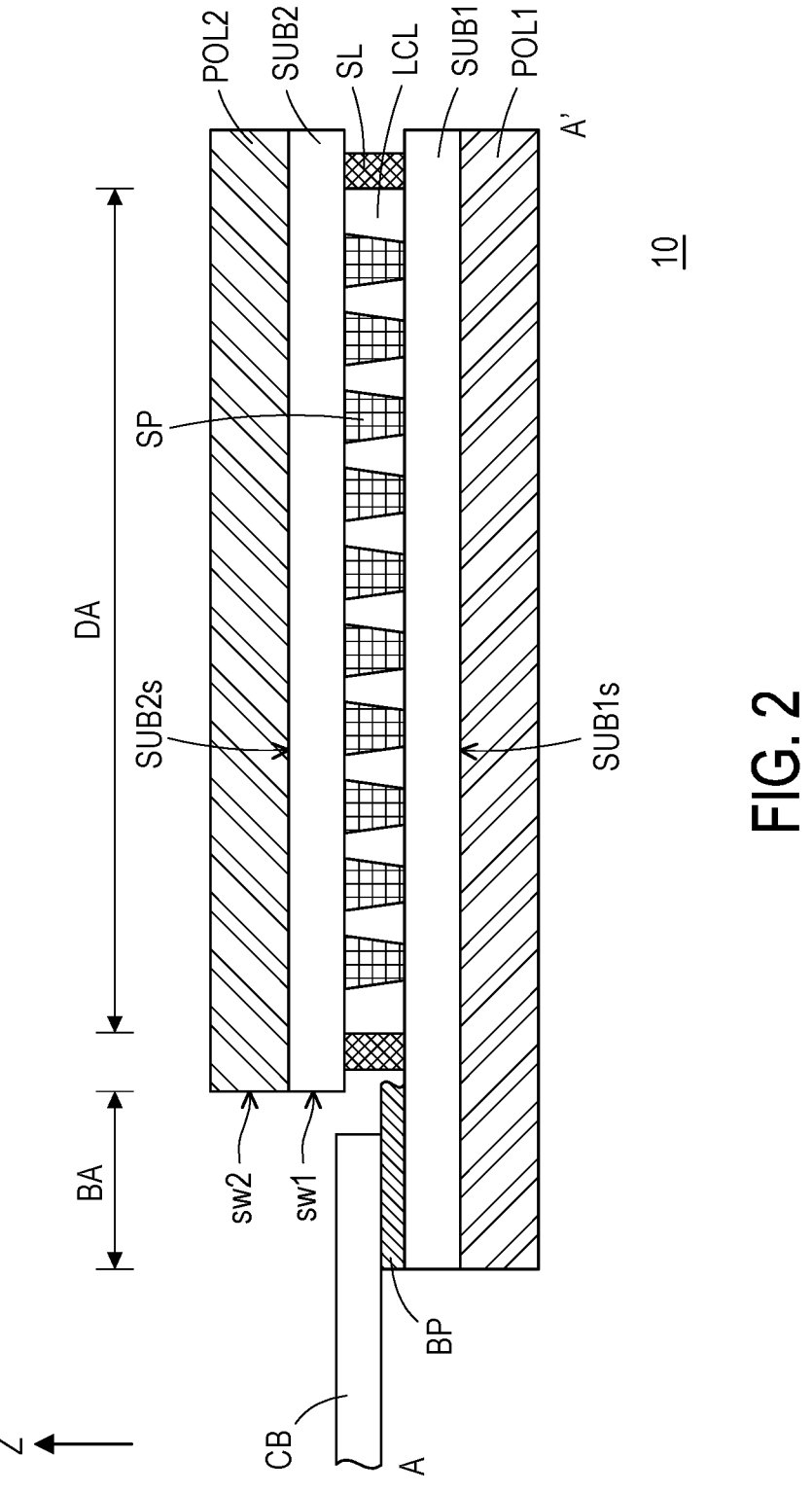
FIG. 2 is a schematic cross-sectional view of the display panel of FIG. 1.
Figure 3:
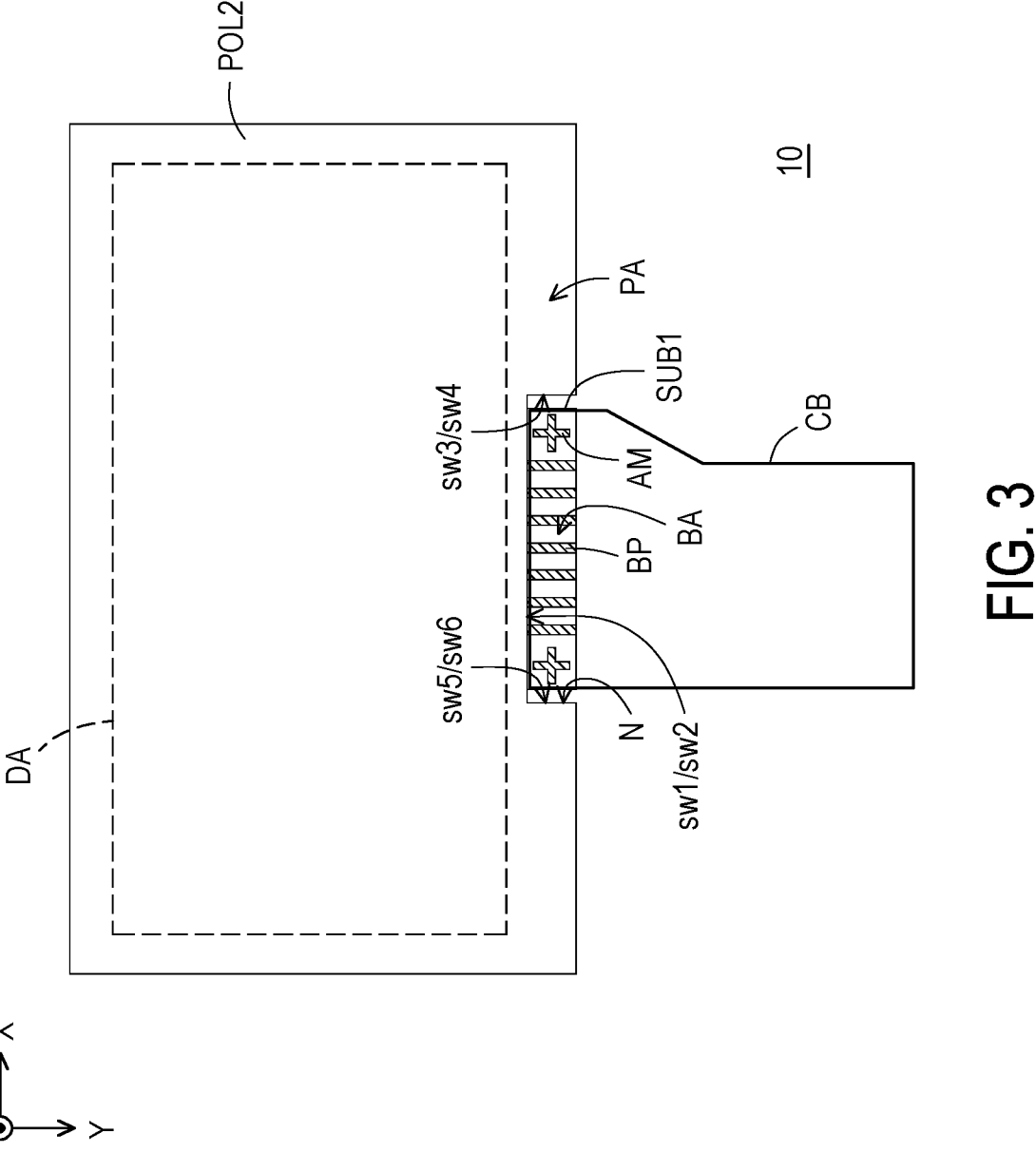
FIG. 3 is a schematic front view of the display panel of FIG. 1.

FIG. 1 is a schematic view of a display panel according to a first embodiment of the disclosure. FIG. 2 is a schematic cross-sectional view of the display panel of FIG. 1. FIG. 3 is a schematic front view of the display panel of FIG. 1. FIG. 4A to FIG. 4E are schematic views of a manufacturing process of the display panel of FIG. 1. FIG. 2 corresponds to a section line A-A' of FIG. 1.

Please refer to FIG. 1 to FIG. 3. A display panel 10 includes a first substrate SUB1, a second substrate SUB2, and a liquid crystal layer LCL. The first substrate SUB1 is provided with a display area DA, a peripheral area PA, and a bonding area BA outside the display area DA and the peripheral area PA. The second substrate SUB2 and the first substrate SUB1 overlap along a direction Z. If not specifically mentioned below, an overlapping relationship between two components is defined by the direction Z, which will not be repeated. In the embodiment, the first substrate SUB1 and the second substrate SUB2 are, for example, flexible substrates, and the materials thereof may include polyimide (PI), polycarbonate (PC), polymethylmethacrylate (PMMA), cyclo olefin polymer (COP), cellulose triacetate (TAC) or other suitable polymer sheets.

The liquid crystal layer LCL is disposed between the first substrate SUB1 and the second substrate SUB2, and overlaps with the display area DA. In the embodiment, the thickness of the liquid crystal layer LCL may be adjusted through the configuration of multiple spacers SP. A sealant layer SL is also provided between the first substrate SUB1 and the second substrate SUB2 to bond the two substrates, and the liquid crystal layer LCL is filled in a sealed space surrounded by the sealant layer SL, but not limited thereto.

The display panel 10 further includes a first polarizer POL1, a second polarizer POL2, and a circuit board CB. The first polarizer POL1 is disposed on a surface SUB1s of the first substrate SUB1 facing away from the second substrate SUB2. The second polarizer POL2 is disposed on a surface SUB2s of the second substrate SUB2 facing away from the first substrate SUB1. In the embodiment, the first polarizer POL1 and the second polarizer POL2 are both entirely attached to the first substrate SUB1 and the second substrate SUB2 respectively.

In detail, the second substrate SUB2 and the second polarizer POL2 respectively have a first side wall sw1 and a second side wall sw2 facing the bonding area BA, and the first side wall sw1 is flush with the second side wall sw2. In the embodiment, the second substrate SUB2 further has a third side wall sw3 and a fifth side wall sw5 facing the bonding area BA and opposite to each other, and the second polarizer POL2 further has a fourth side wall sw4 and a sixth side wall sw6 facing the bonding area BA and opposite to each other. The third side wall sw3 of the second substrate SUB2 is flush with the fourth side wall sw4 of the second polarizer POL2. The fifth side wall sw5 of the second substrate SUB2 is flush with the sixth side wall sw6 of the second polarizer POL2.

More specifically, in the embodiment, the first side wall sw1, the third side wall sw3, and the fifth side wall sw5 of the second substrate SUB2 and the second side wall sw2, the fourth side wall sw4, and the sixth side wall sw6 of the second polarizer POL2 may define a notch N exposing the bonding area BA in the second substrate SUB2 and the second polarizer POL2. The circuit board CB is bonded to the bonding area BA of the first substrate SUB1 via the notch N of the second substrate SUB2 and the second polarizer POL2.

For example, the bonding area BA exposed by the notch N may be provided with multiple bonding pads BP and two alignment marks AM, but not limited thereto. In other embodiments, the number of the bonding pads BP and the alignment marks AM may be adjusted according to different design requirements. The circuit board CB is, for example, a flexible circuit printed (FPC) board or a chip on film (COF) and may include multiple signal pins (not shown). The circuit board CB may be electrically connected to a pixel driving layer (not shown) on the first substrate SUB1 via a one-to-one bonding relationship between the signal pins and the bonding pads BP, but not limited thereto. For example, a thermocompression bonding process may be used to implement the bonding relationship between the signal pins of the circuit board CB and the bonding pad BP on the first substrate SUB1, but not limited thereto.

A manufacturing process of the display panel 10 will be exemplarily described below.

Figure 4A:
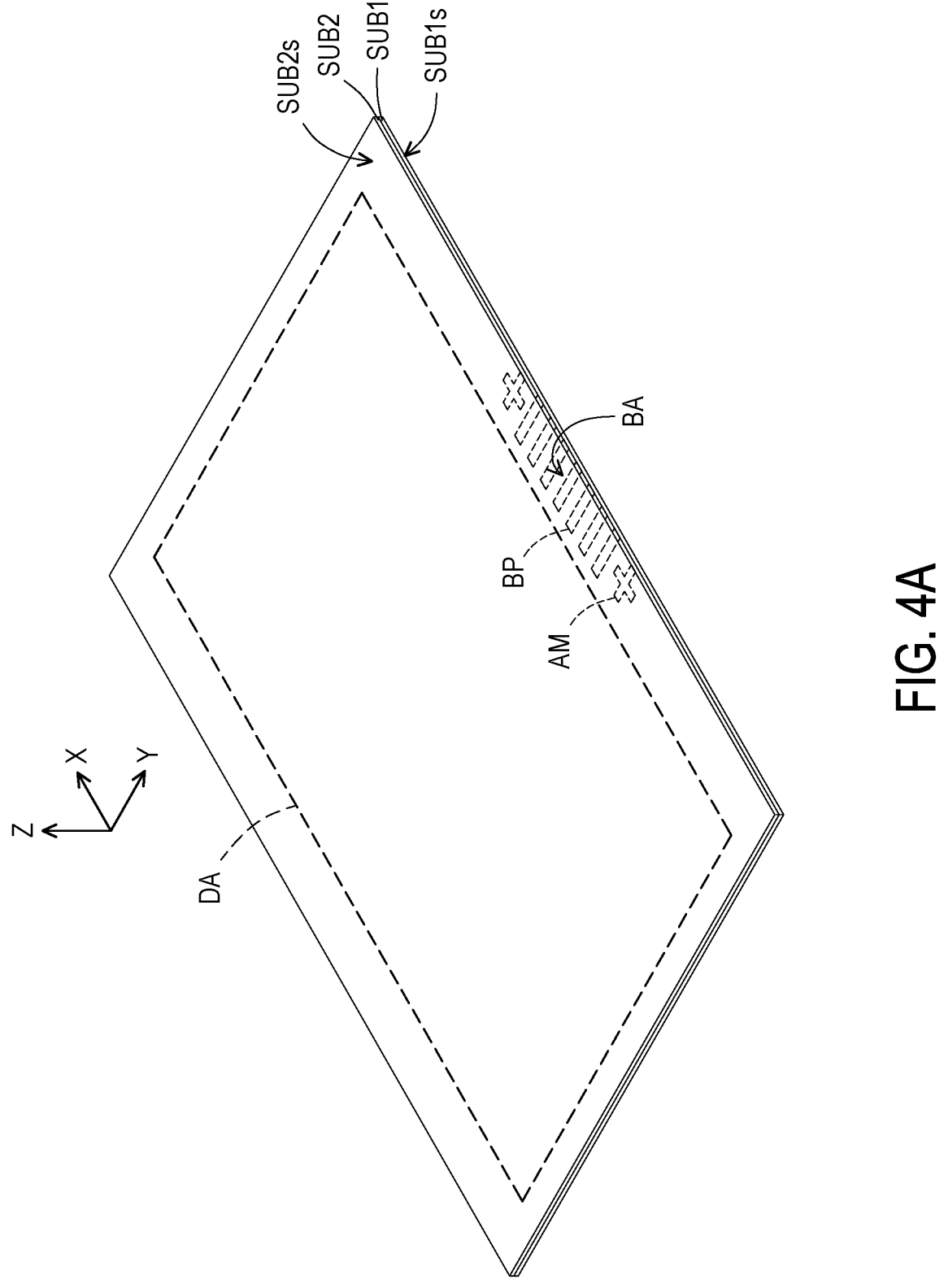
FIG. 4A to FIG. 4E are schematic views of a manufacturing process of the display panel of FIG. 1.

Please refer to FIG. 4A and FIG. 2. First, the first substrate SUB1 and the second substrate SUB2 are assembled, so that the liquid crystal layer LCL is sandwiched between the first substrate SUB1 and the second substrate SUB2. It should be noted that after the assembly of the two substrates, the bonding pad BP and the alignment mark AM in the bonding area BA of the first substrate SUB1 are covered by the second substrate SUB2. Therefore, in order to bond with the circuit board CB, a part overlapping with the bonding area BA in the second substrate SUB2 must be cut to expose the bonding pad BP and the alignment mark AM.

Figure 4B:
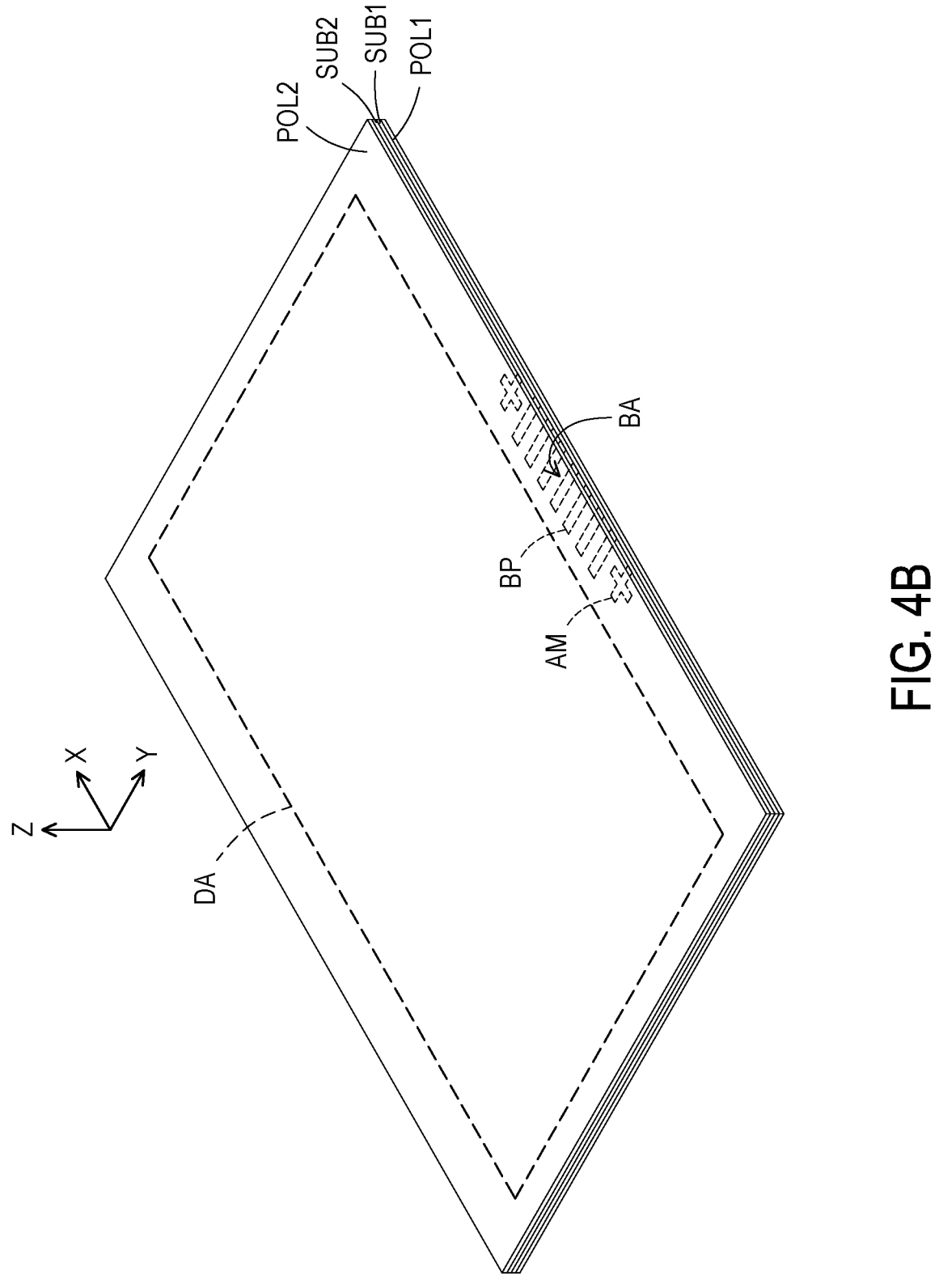

It is particularly noted that before removing the part of the second substrate SUB2 overlapping with the bonding area BA, the first polarizer POL1 is first attached to the surface SUB1s of the first substrate SUB1 facing away from the second substrate SUB2, and the second polarizer POL2 is attached to the surface SUB2s of the second substrate SUB2 facing away from the first substrate SUB1, as shown in FIG. 4A and FIG. 4B. In the embodiment, the polarizer may be entirely attached to the substrate, but not limited thereto. In other embodiments, the polarizer may also only cover the display area DA, the bonding area BA, and a part of the peripheral area PA of the substrate.

The attachment of the polarizer can effectively increase the stiffness of the attached substrate, thereby preventing film shrinkage or film warping of the substrate during the subsequent cutting process.

Figure 4C:
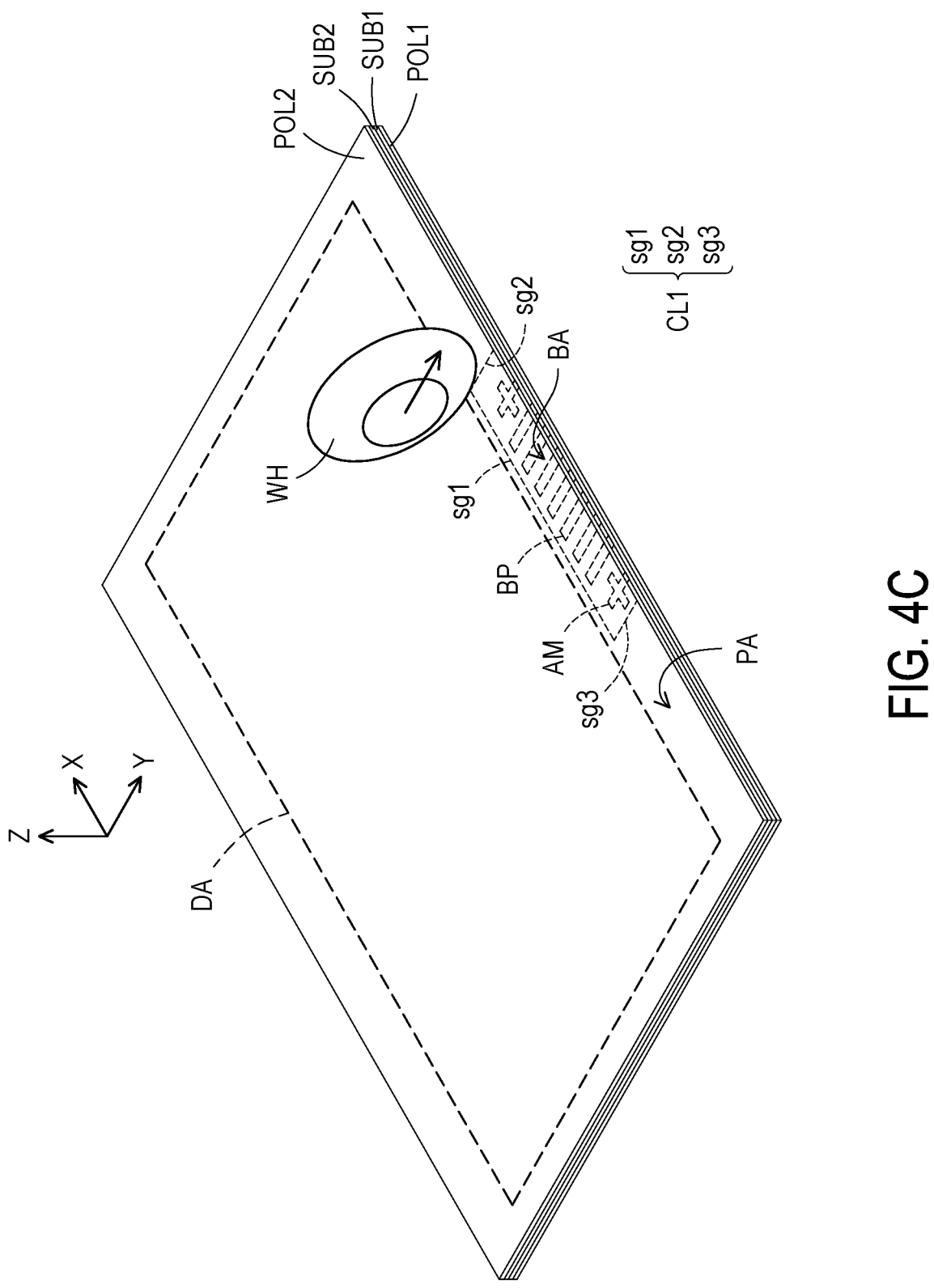
Figure 4D:
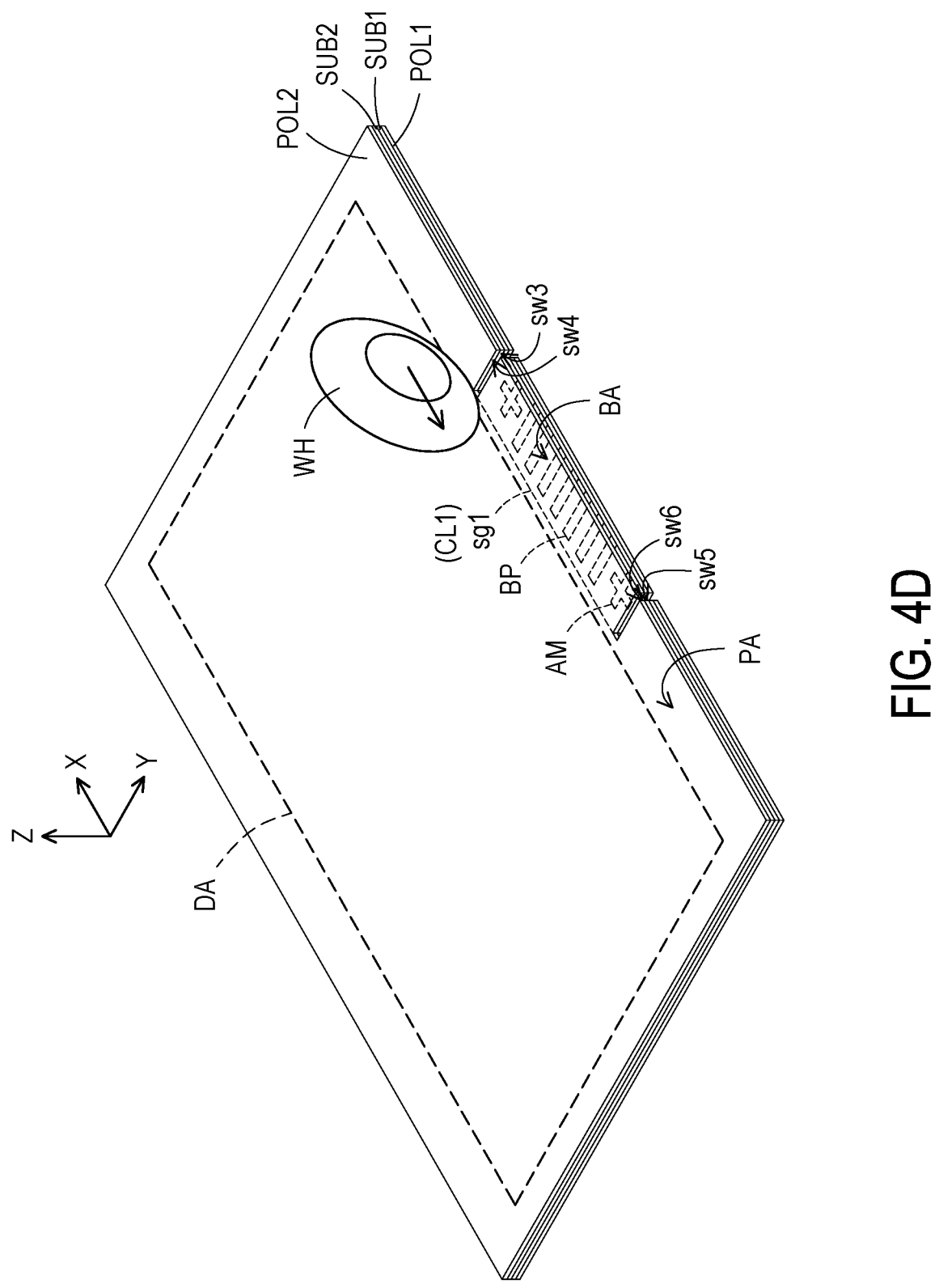

Please refer to FIG. 4C and FIG. 4D. After the polarizer is attached, the second substrate SUB2 and the second polarizer POL2 are cut according to a first cutting line CL1. For example, in the embodiment, the first cutting line CL1 may include a first line segment sg1, a second line segment sg2, and a third line segment sg3. For example, the second line segment sg2 and the third line segment sg3 are located on two opposite sides of the bonding area BA along a direction X and are optionally perpendicular to the first line segment sg1. More specifically, the first line segment sg1 may extend in the direction X, and the second line segment sg2 and the third line segment sg3 may extend in a direction Y and are connected to two opposite ends of the first line segment sg1 in the direction X.

During the cutting process for the second substrate SUB2 and the second polarizer POL2, a wheel cutter WH (or a laser) may first cut the second substrate SUB2 and the second polarizer POL2 along the second line segment sg2 and the third line segment sg3 of the first cutting line CL1, and form two incisions on the two opposite sides of the bonding area BA (as shown in FIG. 4D). The two incisions expose the third side wall sw3 and the fifth side wall sw5 of the second substrate SUB2 and the fourth side wall sw4 and the sixth side wall sw6 of the second polarizer POL2.

For example, when cutting the second substrate SUB2 and the second polarizer POL2 along the second line segment sg2 and the third line segment sg3 of the first cutting line CL1, the wheel cutter WH also cuts the first substrate SUB1 and the first polarizer POL1. Therefore, the two incisions formed by cutting also optionally penetrate the first substrate SUB1 and the first polarizer POL1. That is, in the embodiment, the cutting according to the second line segment sg2 and the third line segment sg3 of the first cutting line CL1 is full cutting of the first substrate SUB1, the second substrate SUB2, the first polarizer POL1, and the second polarizer POL2, but not limited thereto. In another modified embodiment, the cutting according to the second line segment sg2 and the third line segment sg3 of the first cutting line CL1 may also be unilateral cutting only for the second substrate SUB2 and the second polarizer POL2.

Figure 4E:
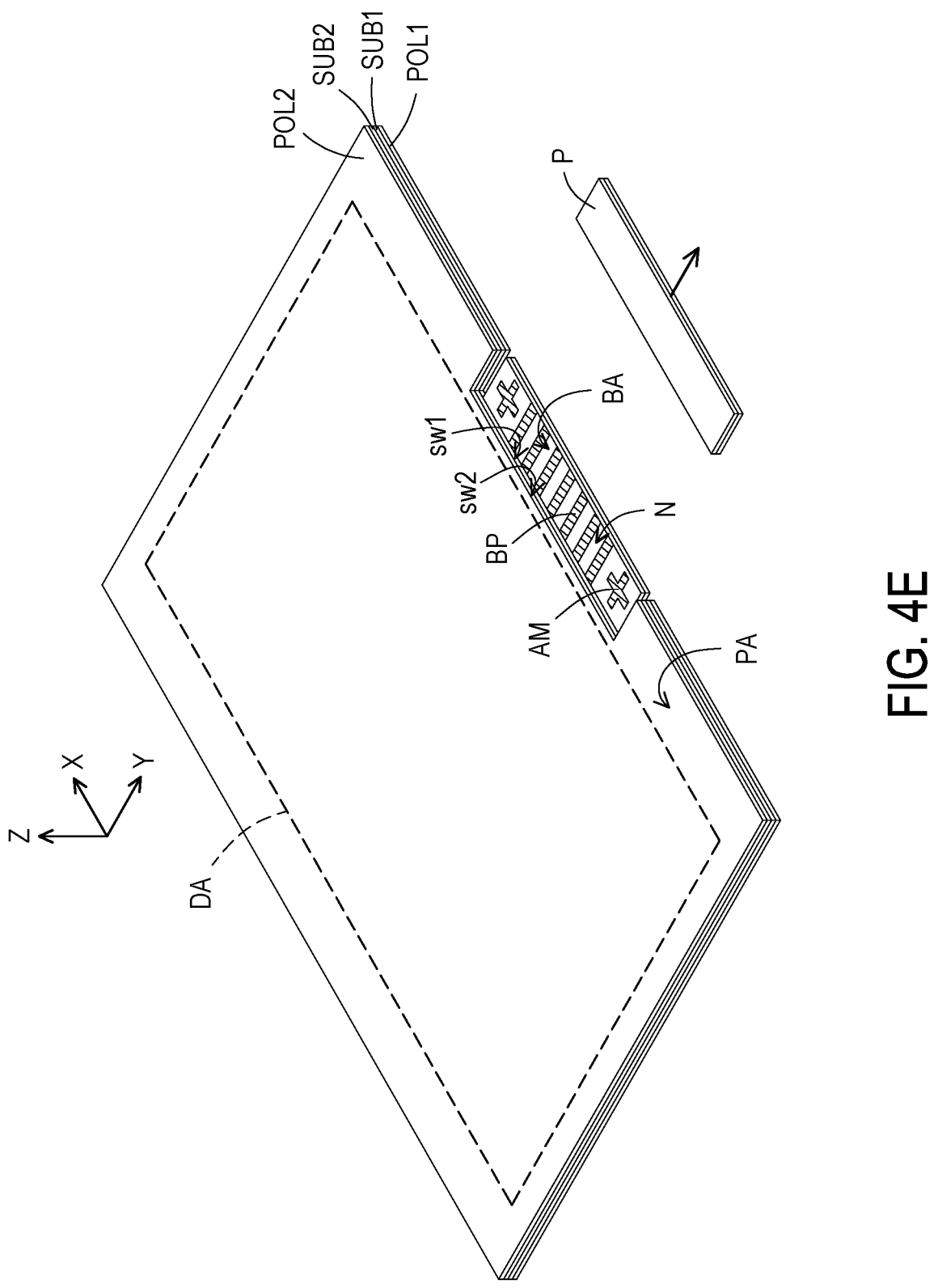

Next, the wheel cutter WH (or the laser) then cuts the second substrate SUB2 and the second polarizer POL2 along the first line segment sg1 of the first cutting line CL1 to remove a part P of the second substrate SUB2 and the second polarizer POL2 overlapping with the bonding area BA, and expose the bonding pads BP and the alignment marks AM in the bonding area BA, as shown in FIG. 4D and FIG. 4E. It is not difficult to understand that the cutting of the second substrate SUB2 and the second polarizer POL2 according to the first line segment sg1 of the first cutting line CL1 is the unilateral cutting only for the second substrate SUB2 and the second polarizer POL2.

However, the disclosure is not limited thereto. In another modified embodiment, the cutting step of the second substrate SUB2 and the second polarizer POL2 along the first line segment sg1 of the first cutting line CL1 may also be performed before the cutting step of the second substrate SUB2 and the second polarizer POL2 along the second line segment sg2 and the third line segment sg3 of the first cutting line CL1.

Please refer to FIG. 4E. It is particularly noted that the second substrate SUB2 and the second polarizer POL2 form the notch N corresponding to the first cutting line CL1 in FIG. 4C after removing the part P overlapping with the bonding area BA. The notch N also exposes the first side wall sw1 of the second substrate SUB2 and the second side wall sw2 of the second polarizer POL2.

After the second substrate SUB2 and the second polarizer POL2 form the notch N exposing the bonding area BA, the bonding process for the circuit board CB and the first substrate SUB1 is performed, so that the circuit board CB is electrically bonded to the bonding pad BP in the bonding area BA via the notch N, as shown in FIG. 1. For example, during the bonding process for the circuit board CB and the bonding pad BP, the circuit board CB may first align with the bonding pad BP using the alignment mark AM in the bonding area BA before thermocompression bonding is performed, so as to ensure that each signal pin (not shown) on the circuit board CB is electrically bonded to the correct bonding pad BP.

So far, the manufacturing of the display panel 10 is completed.

Since the first substrate SUB1 and the second substrate SUB2 are respectively attached with the first polarizer POL1 and the second polarizer POL2 during the cutting process, film shrinkage or film warping of the two substrates during the cutting process can be effectively prevented, thereby ensuring the surface flatness of the two substrates to improve the bonding yield of the circuit board CB during the subsequent manufacturing process.

Some other embodiments will be listed below to describe the disclosure in detail, wherein the same components will be marked with the same reference numerals, and the description of the same technical content will be omitted. Please refer to the foregoing embodiment for the omitted part, which will not be repeated.

Figure 5:
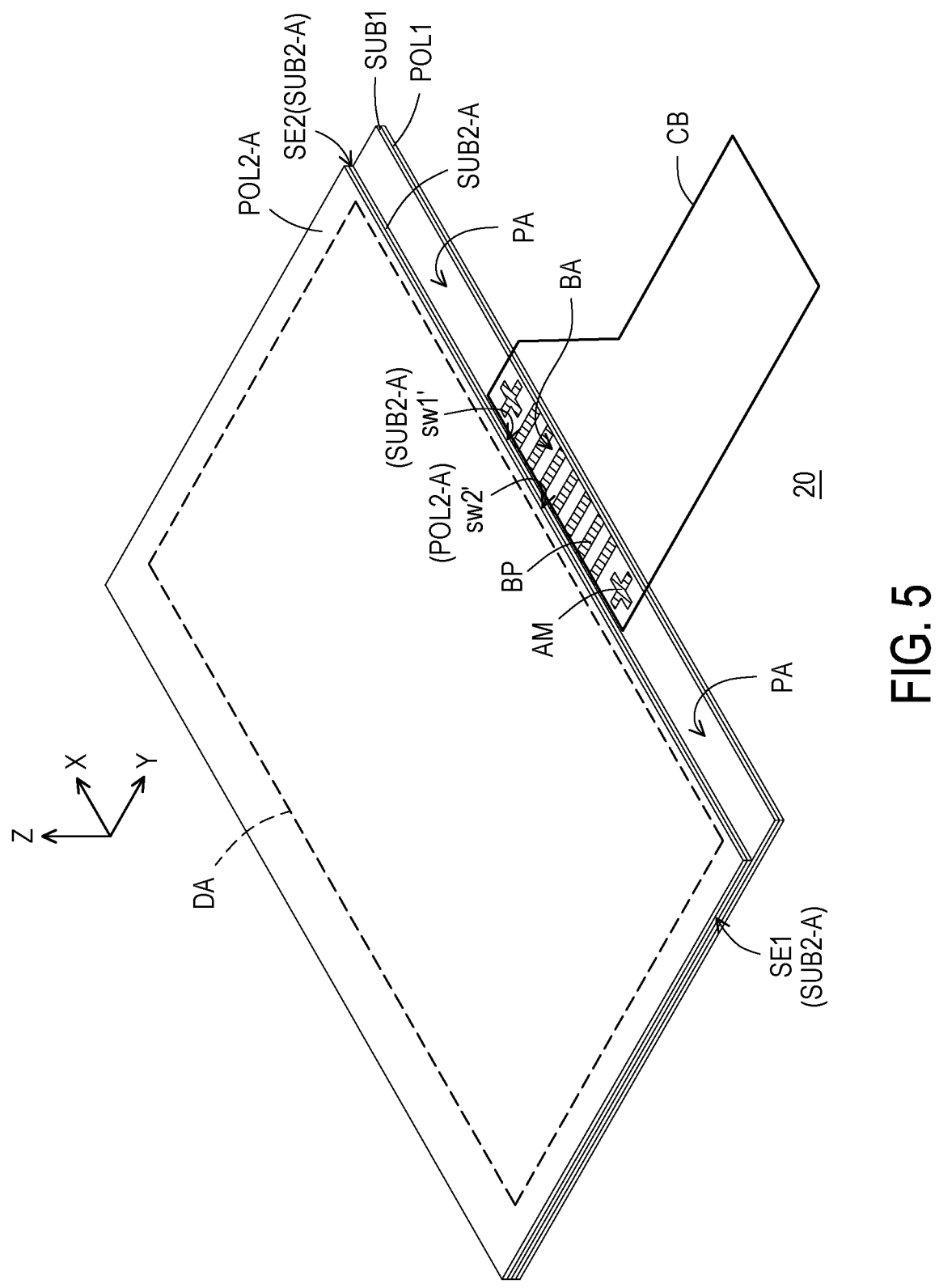
FIG. 5 is a schematic view of a display panel according to a second embodiment of the disclosure.
Figure 6A:
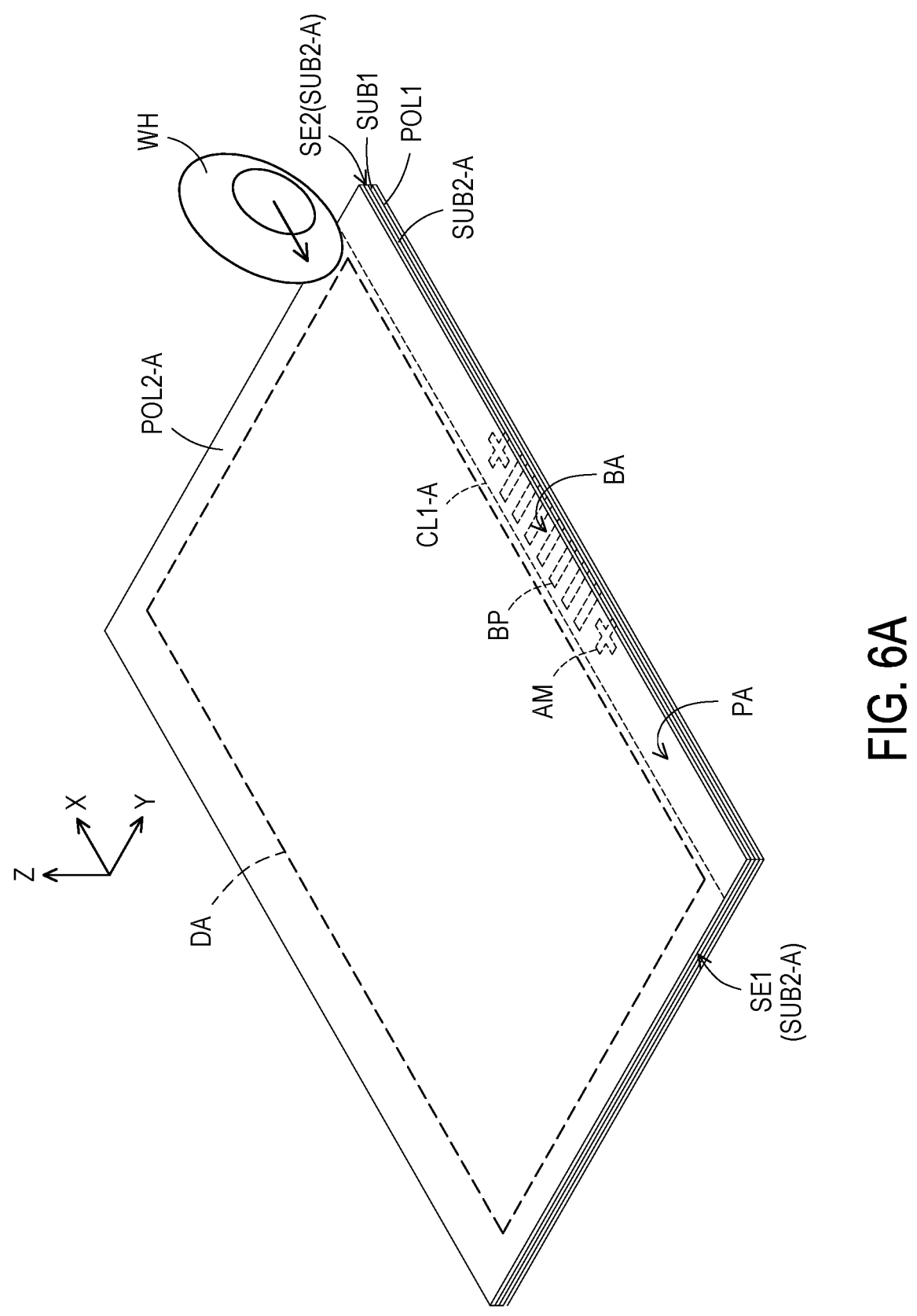
FIG. 6A and FIG. 6B are schematic views of a manufacturing process of the display panel of FIG. 5.
Figure 6B:
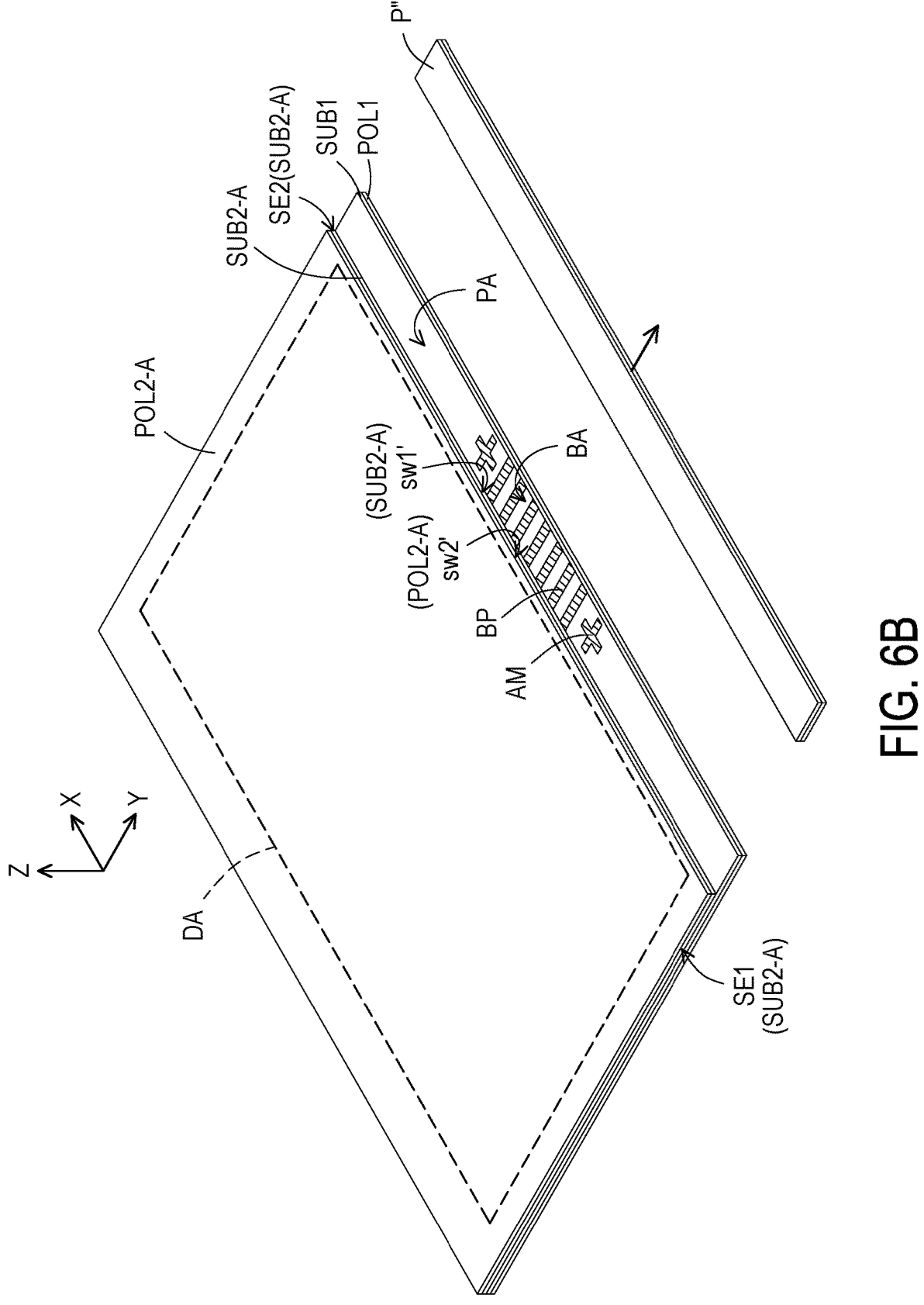

FIG. 5 is a schematic view of a display panel according to a second embodiment of the disclosure. FIG. 6A and FIG. 6B are schematic views of a manufacturing process of the display panel of FIG. 5. Please refer to FIG. 5. The difference between a display panel 20 of the embodiment and the display panel 10 of FIG. 1 is that the cutting manner of the second substrate is different. Specifically, in the embodiment, a second substrate SUB2-A further exposes the peripheral area PA located on the two opposite sides of the bonding area BA along the direction X, that is, the bonding area BA and the peripheral area PA are arranged along the direction X.

It is particularly noted that the second substrate SUB2-A has a first side edge SE1 and a second side edge SE2 facing away from each other along the direction X and located on two opposite sides of the display area DA and the bonding area BA. A first side wall sw1' and a second side wall sw2' of the second substrate SUB2-A and a second polarizer POL2-A facing the bonding area BA extend from the first side edge SE1 of the second substrate SUB2-A to the second side edge SE2 and also face the peripheral area PA.

Different from the configuration of the first cutting line CL1 of FIG. 4C, during the manufacturing process of the display panel 20 of the embodiment, a first cutting line CL1-A on which cutting of the second substrate SUB2-A and the second polarizer POL2-A is based extends from the first side edge SE1 of the second substrate SUB2-A to the second side edge SE2 (as shown in FIG. 6A). More specifically, the first cutting line CL1-A extends through the peripheral area PA and the bonding area BA on a side outside the display area DA.

Therefore, after cutting and removing a part P'' of the second substrate SUB2-A and the second polarizer POL2-A overlapping with the bonding area BA, the bonding area BA and the peripheral area PA are exposed at the same time, and the first side wall sw1' and the second side wall sw2' of the second substrate SUB2-A and the second polarizer POL2-A facing the bonding area BA and the peripheral area PA also extend between the first side edge SE1 and the second side edge SE2 of the second substrate SUB2-A (as shown in FIG. 6B).

Since the other steps of the manufacturing method of the display panel 20 are similar to the display panel 10 of FIG. 1, detailed description may be found in relevant paragraphs of the foregoing embodiment, which will not be repeated.

In particular, since the first substrate SUB1 and the second substrate SUB2-A are respectively attached with the first polarizer POL1 and the second polarizer POL2-A during the cutting process, film shrinkage or film warping of the two substrates during the cutting process can be effectively prevented, thereby ensuring the surface flatness of the two substrates to improve the bonding yield of the circuit board CB during the subsequent manufacturing process.

Figure 7:
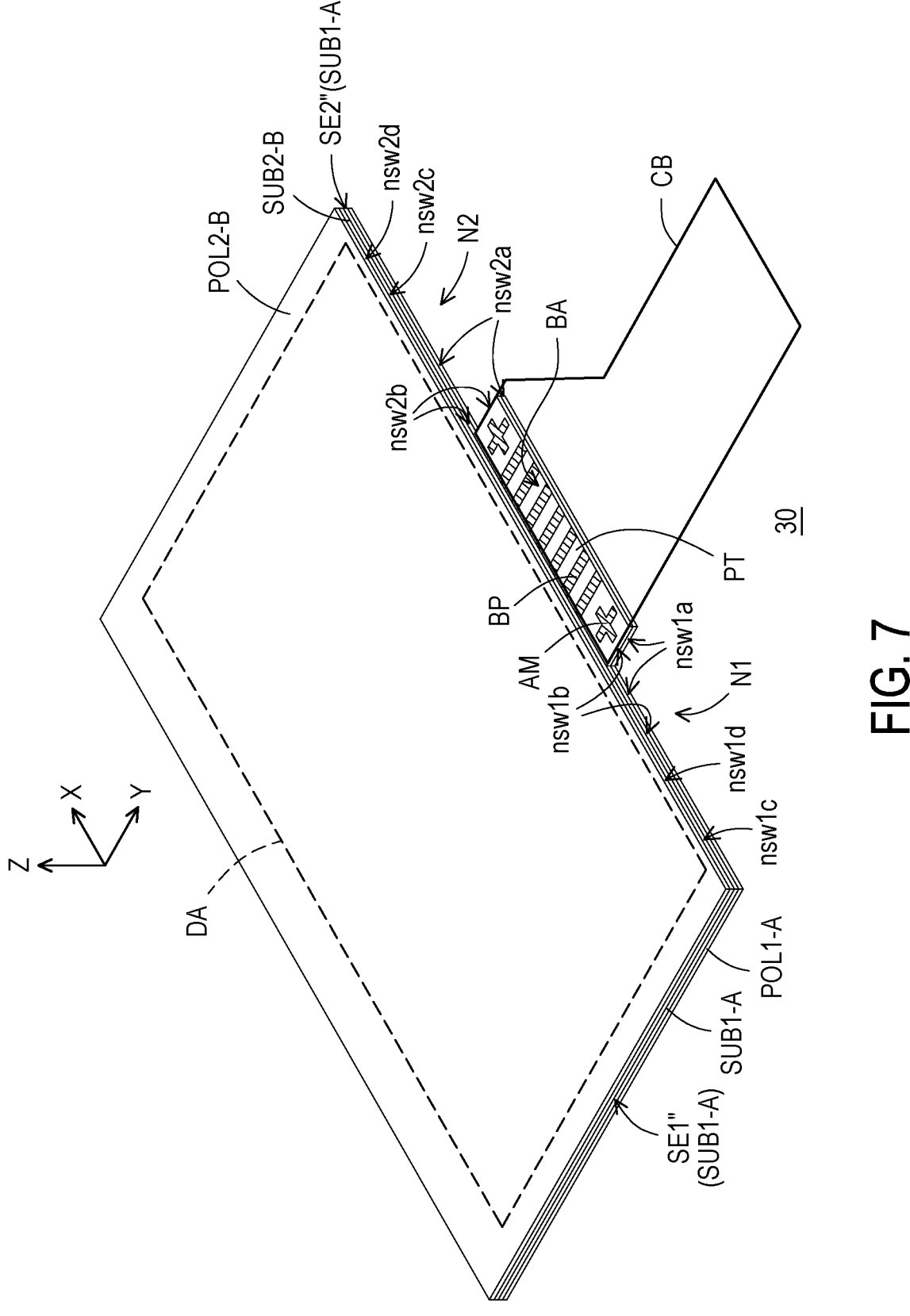
FIG. 7 is a schematic view of a display panel according to a third embodiment of the disclosure.
Figure 8A:
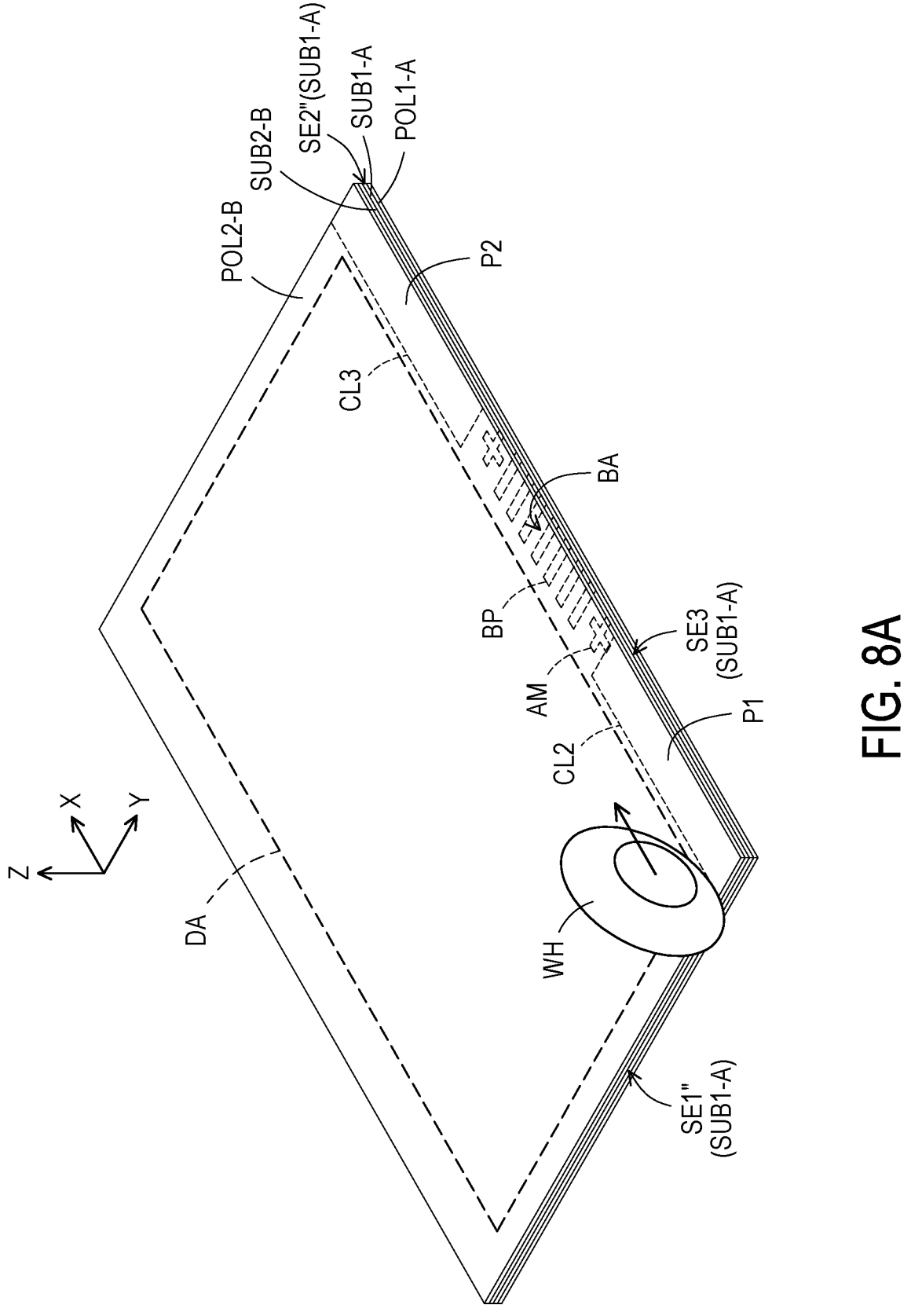
FIG. 8A to FIG. 8C are schematic views of a manufacturing process of the display panel of FIG. 7.
Figure 8B:
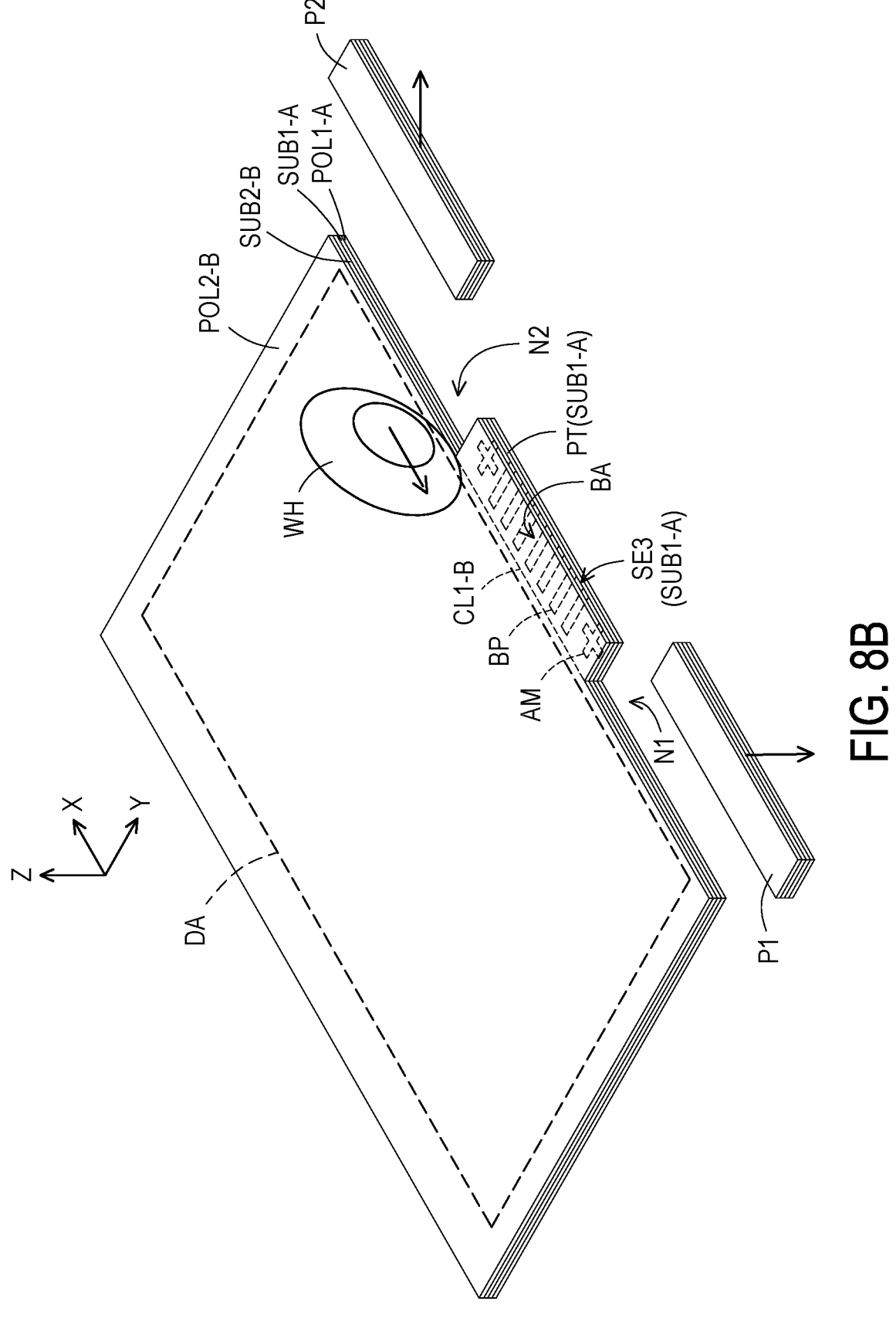
Figure 8C:
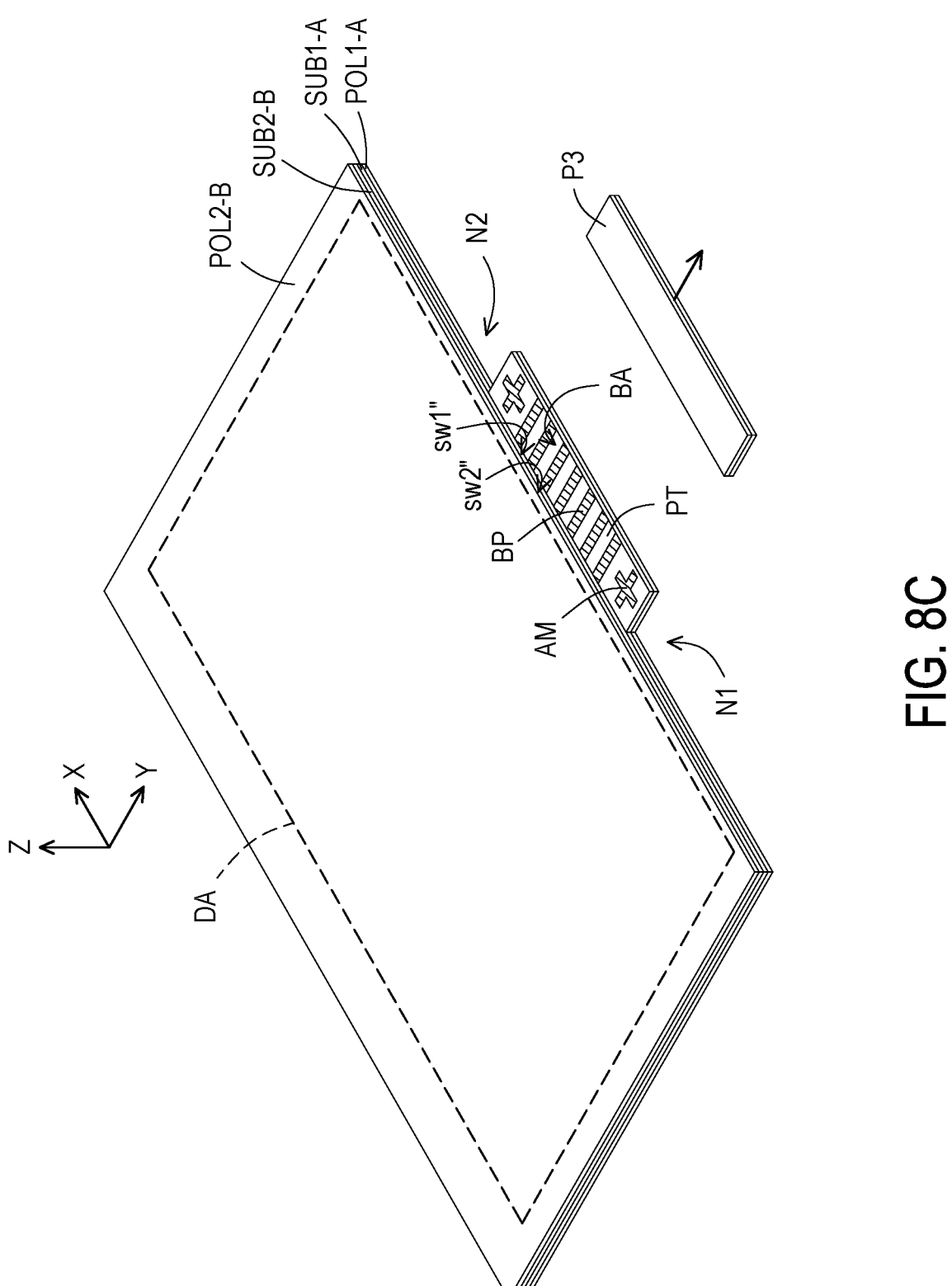

FIG. 7 is a schematic view of a display panel according to a third embodiment of the disclosure. FIG. 8A to FIG. 8C are schematic views of a manufacturing process of the display panel of FIG. 7. Please refer to FIG. 7. The difference between a display panel 30 of the embodiment and the display panel 10 of FIG. 1 is that the cutting manners of the first substrate and the second substrate are different.

For example, a manufacturing method of the display panel 30 of the embodiment may further include cutting a first substrate SUB1-A, a second substrate SUB2-B, a first polarizer POL1-A, and a second polarizer POL2-B according to a second cutting line CL2 to remove a part P1 of the first substrate SUB1-A, the second substrate SUB2-B, the first polarizer POL1-A, and the second polarizer POL2-B located on a side of the bonding area BA and form a first notch N1, and cutting the first substrate SUB1-A, the second substrate SUB2-B, the first polarizer POL1-A, and the second polarizer POL2-B according to a third cutting line CL3 to remove a part P2 of the first substrate SUB1-A, the second substrate SUB2-B, the first polarizer POL1-A, and the second polarizer POL2-B located on the other side of the bonding area BA and form a second notch N2, as shown in FIG. 8A and FIG. 8B. From another point of view, after forming the first notch N1 and the second notch N2, the first substrate SUB1-A is formed with a protruding portion PT, and the protruding portion PT is provided with a bonding pad BP and an alignment mark AM.

In the embodiment, the first substrate SUB1-A has a first side edge SE1'' and a second side edge SE2'' facing away from each other along the direction X and a third side edge SE3 connecting the first side edge SE1'' and the second side edge SE2''. It is particularly noted that the first cutting line CL1-B is parallel to the third side edge SE3 of the first substrate SUB1-A (as shown in FIG. 8B), the second cutting line CL2 bendingly extends from the first side edge SE1'' to the third side edge SE3, and the third cutting line CL3 bendingly extends from the second side edge SE2'' to the third side edge SE3 (as shown in FIG. 8A).

Please refer to FIG. 8B and FIG. 8C. After forming the first notch N1 and the second notch N2, the second substrate SUB2-B and the second polarizer POL2-B are cut according to the first cutting line CL1-B to remove a part P3 of the second substrate SUB2-B and the second polarizer POL2-B overlapping with the bonding area BA and expose the bonding pad BP and the alignment mark AM on the first substrate SUB1-A and a first side wall sw1'' and a second side wall sw2'' of the second substrate SUB2-B and the second polarizer POL2-B facing the bonding area BA and flush with each other. However, the disclosure is not limited thereto. In another modified embodiment, the cutting step of the second substrate SUB2-B and the second polarizer POL2-B according to the first cutting line CL1-B may also be performed before the forming step of the first notch N1 and the second notch N2.

Since the other steps of the manufacturing method of the display panel 30 are similar to the display panel 10 of FIG. 1, detailed description may be found in relevant paragraphs of the foregoing embodiment, which will not be repeated.

In particular, since the first substrate SUB1-A and the second substrate SUB2-B are respectively attached with the first polarizer POL1-A and the second polarizer POL2-B during the cutting process, film shrinkage or film warping of the two substrates during the cutting process can be effectively prevented, thereby ensuring the surface flatness of the two substrates to improve the bonding yield of the circuit board CB during the subsequent manufacturing process.

Please refer to FIG. 7. Based on the cutting steps shown in FIG. 8A to FIG. 8C, in the display panel 30 of the embodiment, the first polarizer POL1-A, the first substrate SUB1-A, the second substrate SUB2-B, and the second polarizer POL2-B respectively have a side wall nsw1*a* of the first notch N1, a side wall nsw1*b* of the first notch N1, a side wall nsw1*c* of the first notch N1, and a side wall nsw1*d* of the first notch N1 defining the first notch N1, and the side walls of the first notch N1 are flush with each other. On the other hand, the first polarizer POL1-A, the first substrate SUB1-A, the second substrate SUB2-B, and the second polarizer POL2-B also respectively have a side wall nsw2*a* of the second notch N2, a side wall nsw2*b* of the second notch N2, a side wall nsw2*c* of the second notch N2, and a side wall nsw2*d* of the second notch N2 defining the second notch N2, and the side walls of the second notch N2 are flush with each other.

It is particularly noted that the side wall nsw1*b* of the first notch N1 and the side wall nsw2*b* of the second notch N2 of the first substrate SUB1-A may define the protruding portion PT of the first substrate SUB1-A, and the protruding portion PT is provided with the bonding area BA. The circuit board CB is electrically bonded to the bonding area BA on the protruding portion PT. In other words, the side wall nsw1*b* of the first notch N1 of the first substrate SUB1-A may extend from the first side edge SE1" to the third side edge SE3, and the side wall nsw2*b* of the second notch N2 of the first substrate SUB1-A may extend from the second side edge SE2" to the third side edge SE3.

In summary, in the manufacturing method of the display panel according to an embodiment of the disclosure, the polarizer is first entirely attached to the substrate before removing the part of the substrate overlapping with the bonding area. In this way, film shrinkage or film warpage during the cutting process due to insufficient stiffness of the substrate can be prevented, thereby improving the bonding yield of the circuit board during the subsequent manufacturing process.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A display panel, comprising:
   a first substrate, provided with a display area and a bonding area outside the display area;
   a second substrate, overlapping with the first substrate and exposing the bonding area of the first substrate;
   a liquid crystal layer, disposed between the first substrate and the second substrate, and overlapping with the display area;

a first polarizer, disposed on a surface of the first substrate facing away from the second substrate;
   a second polarizer, disposed on a surface of the second substrate facing away from the first substrate; and
   a circuit board, bonded to the bonding area of the first substrate, wherein a first side wall of the second substrate facing the bonding area is flush with a second side wall of the second polarizer facing the bonding area,
   wherein the first substrate is further provided with a peripheral area outside the display area and the bonding area, the second substrate does not overlap with the peripheral area, the bonding area and the peripheral area are arranged along a first direction,
   wherein the second substrate has a first side edge and a second side edge facing away from each other along the first direction, and the first side wall extends from the first side edge to the second side edge and faces the peripheral area.

2. A display panel according to claim 1, further comprising:
   a first substrate, provided with a display area and a bonding area outside the display area;
   a second substrate, overlapping with the first substrate and exposing the bonding area of the first substrate;
   a liquid crystal layer, disposed between the first substrate and the second substrate, and overlapping with the display area;
   a first polarizer, disposed on a surface of the first substrate facing away from the second substrate;
   a second polarizer, disposed on a surface of the second substrate facing away from the first substrate;
   a circuit board, bonded to the bonding area of the first substrate, wherein a first side wall of the second substrate facing the bonding area is flush with a second side wall of the second polarizer facing the bonding area;
   a first notch, disposed on a side of the bonding area, wherein the first substrate, the second substrate, the first polarizer, and the second polarizer are respectively flush with a side wall of the first notch defining the first notch; and
   a second notch, disposed on other side of the bonding area, wherein the first substrate, the second substrate, the first polarizer, and the second polarizer are respectively flush with a side wall of the second notch defining the second notch, and the side wall of the first notch and the side wall of the second notch face away from each other.

3. The display panel according to claim 2, wherein the side wall of the first notch and the side wall of the second notch of the first substrate define a protruding portion of the first substrate, and the protruding portion is provided with the bonding area.

4. The display panel according to claim 3, wherein the first notch, the bonding area, and the second notch are arranged along a first direction, the first substrate has a first side edge and a second side edge facing away from each other along the first direction, the side wall of the first notch of the first substrate extends from the first side edge, and the side wall of the second notch of the first substrate extends from the second side edge.

* * * * *